United States Patent
Li et al.

(10) Patent No.: US 11,568,118 B2
(45) Date of Patent: Jan. 31, 2023

(54) ELECTRONIC DEVICE, METHOD FOR GENERATING PACKAGE DRAWING AND COMPUTER READABLE STORAGE MEDIUM

(71) Applicant: BOE Technology Group Co., Ltd., Beijing (CN)

(72) Inventors: Qiang Li, Beijing (CN); Junxin Zhao, Beijing (CN); Jie Li, Beijing (CN); Hong Wang, Beijing (CN); Suo Zhang, Beijing (CN); Dong Chai, Beijing (CN); Haohan Wu, Beijing (CN); Xuefeng Kan, Beijing (CN); Fei Yuan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 128 days.

(21) Appl. No.: 17/030,689

(22) Filed: Sep. 24, 2020

(65) Prior Publication Data

US 2021/0133382 A1    May 6, 2021

(30) Foreign Application Priority Data

Oct. 31, 2019 (CN) .......................... 201911055575.2

(51) Int. Cl.
| | |
|---|---|
| *G06F 30/30* | (2020.01) |
| *G06F 30/392* | (2020.01) |
| *G06F 9/54* | (2006.01) |
| *G06F 30/31* | (2020.01) |
| *G06F 113/18* | (2020.01) |

(52) U.S. Cl.
CPC ............ *G06F 30/392* (2020.01); *G06F 9/542* (2013.01); *G06F 30/31* (2020.01); *G06F 2113/18* (2020.01)

(58) Field of Classification Search
CPC ........ G06F 30/392; G06F 9/542; G06F 30/31; G06F 2113/18
USPC ......................................................... 716/118
See application file for complete search history.

(56) References Cited

U.S. PATENT DOCUMENTS

| | | | | |
|---|---|---|---|---|
| 2006/0002215 A1* | 1/2006 | Okano | ................... | G06F 30/394 700/12 |
| 2019/0050518 A1* | 2/2019 | Jiang | ..................... | G06F 30/392 |

* cited by examiner

*Primary Examiner* — Jack Chiang
*Assistant Examiner* — Brandon Bowers
(74) *Attorney, Agent, or Firm* — Nath, Goldberg & Meyer; Joshua B. Goldberg

(57) ABSTRACT

The present disclosure provides an electronic device, a method for generating a package drawing, and a computer readable storage medium. The electronic device includes a display device and a processor, the processor is configured to obtain a type of the element and size parameters corresponding to the element input by a user; determine a size and a position of each of pads corresponding to the element according to the type of the element and the size parameters corresponding to the element, and draw the pads; determine coordinates of endpoints of an entity layer corresponding to the element, and draw the entity layer; determine coordinates of endpoints of a height layer corresponding to the element, and draw the height layer; and determine coordinates of endpoints of a screen layer corresponding to the element, and draw the screen layer.

14 Claims, 5 Drawing Sheets

ELECTRONIC DEVICE, METHOD FOR GENERATING PACKAGE DRAWING AND COMPUTER READABLE STORAGE MEDIUM

CROSS-REFERENCE TO RELATED APPLICATION

This application claims priority to Chinese Patent Application No. 201911055575.2, filed on Oct. 31, 2019, the contents of which are incorporated herein by reference in the entirety.

TECHNICAL FIELD

The present disclosure relates to the field of circuit board design technology, and more particularly, to an electronic device, a method for generating a package drawing of an element, and a computer readable storage medium.

BACKGROUND

When engineers use Cadence and other software to draw circuit boards, they first need to create package files for elements, for example, package files for drawing resistors, package files for drawing transistors, and package files for drawing connectors. Then these drawn package files are imported, and wiring is then performed. Most of elements are standard types of elements, that is, for elements of a same type, a difference therebetween lies in the individual sizes, but the overall shapes thereof are similar. For any type of elements, engineers need to read the specifications of the elements, and accordingly draw the package patterns of the elements manually in the design software, and the package files of the elements are then generated. These tasks are simple, boring and tedious, and consume a lot of energy and time of the engineers.

SUMMARY

According to a first aspect of the present disclosure, there is provided an electronic device including: a display device and a processor; wherein the display device is configured to display a first prompting message for a user to input a type of an element, and display a second prompting message for the user to input a size parameter corresponding to the element.

The processor is configured to obtain the type of the element and the size parameter corresponding to the element input by the user; determine a size and a position of each of pads corresponding to the element according to the type of the element and the size parameters corresponding to the element, and draw the pads; determine coordinates of endpoints of an entity layer corresponding to the element according to the type of the element and the size parameters corresponding to the element, and draw the entity layer; determine coordinates of endpoints of a height layer corresponding to the element according to the type of the element and the size parameters corresponding to the element, and draw the height layer; and determine coordinates of endpoints of a screen layer corresponding to the element according to the type of the element and the size parameters corresponding to the element, and draw the screen layer.

According to an embodiment of the present disclosure, the processor is further configured to set a shape of each of the pads corresponding to the element according to the type of the element; set a size and a shape of a surface pad corresponding to the element according to the size parameters and the shape of each of the pad; and display the pads corresponding to the element on the display device according to a spacing parameter between the pads.

According to an embodiment of the present disclosure, the processor is further configured to set a size and a shape of a surface window according to the size parameters and the shape of each of the pads; and set a size and a shape of a surface steel mesh according to the size parameters and the shape of each of the pads.

According to an embodiment of the present disclosure, the processor is further configured to display the pads, the entity layer, the height layer, and the screen layer which have been drawn on the display device.

According to an embodiment of the present disclosure, the processor is further configured to save the pads, the entity layer, the height layer, and the screen layer which have been drawn as a package file of the element.

According to a second aspect of the present disclosure, there is provided a method for generating a package drawing of an element, the method includes: obtaining a type of the element and size parameters corresponding to the element; determining a size and a position of each of pads corresponding to the element according to the type of the element and the size parameters corresponding to the element, and drawing the pads; determining coordinates of endpoints of an entity layer corresponding to the element according to the type of the element and the size parameters corresponding to the element, and drawing the entity layer; determining coordinates of endpoints of a height layer corresponding to the element according to the type of the element and the size parameters corresponding to the element, and drawing the height layer, and determining coordinates of endpoints of a screen layer corresponding to the element according to the type of the element and the size parameters corresponding to the element, and drawing the screen layer.

According to an embodiment of the present disclosure, the size parameters corresponding to the element comprises size parameters of each of the pads corresponding to the element and a spacing parameter between the pads corresponding to the element.

According to an embodiment of the present disclosure, the determining a size and a position of each of the pads corresponding to the element according to the type of the element and the size parameters corresponding to the element and drawing the pads includes: setting a shape of each of the pads corresponding to the element according to the type of the element; setting a size and a shape of a surface pad corresponding to the element according to the size parameters and the shape of each of the pads; and displaying the pads corresponding to the element on a drawing page according to the spacing parameter between the pads.

According to an embodiment of the present disclosure, the determining a size and a position of each of the pads corresponding to the element according to the type of the element and the size parameters corresponding to the element and drawing the pads includes: setting a size and a shape of a surface window according to the size parameters and the shape of each of the pads; and setting a size and a shape of a surface steel mesh according to the size parameters and the shape of each of the pads.

According to an embodiment of the present disclosure, the method further includes: changing the coordinate of each of the pads, the entity layer, the height layer, and the screen layer, so as to set a geometric center of a polygon formed by connecting centers of the pads at a coordinate origin of the drawing page.

According to an embodiment of the present disclosure, the method further includes: determining that obtaining of the size parameters corresponding to the element has been completed before drawing the pads, the entity layer, the height layer, and the screen layer.

According to an embodiment of the present disclosure, the method further includes: determining that the obtained size parameter corresponding to the element satisfies a criterion according to the type of the element before drawing the pads, the entity layer, the height layer, and the screen layer.

According to an embodiment of the present disclosure, the method further includes: outputting a prompting message when determining that the obtaining of the size parameter corresponding to the element has not been completed or determining that the obtained size parameters corresponding to the element does not satisfy the criterion.

According to a third aspect of the present disclosure, there is provided a non-volatile computer readable storage medium storing instructions that can be executed by a processor to cause the processor to execute the method according to the second aspect of the present disclosure.

DETAILED DESCRIPTION

To make those skilled in the art better understand the technical solutions of the present disclosure, the present disclosure will be further described in detail below in conjunction with the accompanying drawings and embodiments. It should be noted that the following description of some embodiments has been presented for purposes of illustration and description. It is not intended to be exhaustive or to limit to the precise forms disclosed, and the repeated description is omitted in order to avoid redundancy.

Related technical terms are introduced as follows. A entity layer is also called an assembly layer, which can represent an actual size of a copper-containing part of an element, and is used to generate an assembly drawing of the element. A height layer represents a physical size of the element, and is configured to prevent a case where a distance between the package drawings of two elements in a drawn circuit board is too short, so as to cause structural interference between the two elements after they are actually assembled. A screen layer represents a pattern produced by a screen printing process and can be used to mark the elements on the circuit board. A surface pad is a graphics that represents an actual pad area in the package drawing. A surface window represents an area on the circuit board that is not covered by an insulating layer such as green oil for each pad. A surface steel mesh represents an opening position of a porous steel mesh.

It is easy to understand that for the package drawing of a same element, the pad, the entity layer, the height layer, and the screen layer in the actual circuit board correspond to a pattern of a same element, and thus a position of the element represented by the drawn pad, a position of the element represented by the drawn entity layer, a position of the element represented by the drawn height layer, and a position of the element represented by the drawn screen layer in a current drawing space are substantially a same position. For example, a center of the entity layer and a center of the height layer drawn in the current drawing space are substantially at a same coordinate position.

The embodiments of the present disclosure are based on a same inventive concept, and the details of specific embodiments can be referred to and combined with each other.

The present disclosure provides, inter alia, an electronic device, a method for generating a package drawing, and a computer readable storage medium that substantially obviate one or more of the problems due to limitations and disadvantages of the related art. In the present disclosure, by means of parameterization, on one hand, the package drawings of elements can be generated simply and quickly; on the other hand, it can effectively reduce the time for drawing element packages, improve circuit design efficiency, and improve the efficiency and accuracy of the entire circuit design process.

Figure 1:
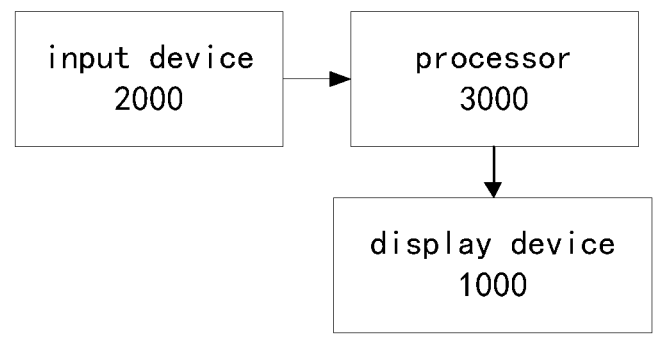
FIG. 1 is a block diagram showing an electronic device according to an embodiment of the present disclosure.

FIG. 1 is a block diagram showing an electronic device according to an embodiment of the present disclosure. Referring to FIG. 1, in some implementations, the electronic device may include a display device 1000 and a processor 3000. The display device 1000 is configured to display a first prompting message for a user to input the type of the element, and display a second prompting message for the user to input the size parameter corresponding to the element. The processor 3000 is configured to obtain the type of the element and the size parameter corresponding to the element input by the user; determine the size and position of each pad corresponding to the element according to the type of the element and the size parameter corresponding to the element, and draw each pad; determine the coordinates of the endpoints of the entity layer corresponding to the element according to the type of the element and the size parameter corresponding to the element, and draw the entity layer; determine the coordinates of the endpoints of the height layer corresponding to the element according to the type of the element and the size parameter corresponding to the element, and draw the height layer; and determine the coordinates of the endpoints of the screen layer corresponding to the element according to the type of the element and the size parameter corresponding to the element, and draw the screen layer.

In some implementations, the display device 1000 may be any display device with a display function. In some implementations, the processor 3000 may be a processing device with processing functions such as a single-chip microcomputer, a central processing unit (CPU), or the like. The processor 3000 can enable the user to manually input the type and corresponding size parameters of the element required to be determined through an input device 2000 such as a mouse, a keyboard, etc., and can also obtain the above information through network communication. There is no specific limitation on how the processor 3000 obtains the information.

In this way, only the type of the element and the size parameter(s) corresponding to the element need to be provided to the electronic device according to the present disclosure, the electronic device can complete the drawing of the pads, entity layer, height layer, and screen layer corresponding to the element, and thus it can greatly simplify the drawing work of the engineer.

In some implementations, the processor 3000 is further configured to set the shape of each of the pads corresponding to the element according to the type of the element; set a size and shape of a surface pad corresponding to the element according to the size parameter(s) and shape of each of the pads; and display the pads corresponding to the element sequentially on the display device 1000 according to the spacing parameters of the pads.

In this way, the user can more conveniently and intuitively see the drawing of each of the pads drawn by the processor 3000.

In some implementations, the processor 3000 is further configured to set a size and shape of a surface window according to the size parameter(s) and the shape of each of the pads; and set a size and shape of a surface steel mesh according to the size parameter(s) of each and the shape of each of the pads.

In this way, the package drawing can be drawn more accurately through the electronic device.

In some implementations, the processor 3000 is further configured to display the pads, the entity layer, the height layer, and the screen layer that are drawn on the display device 1000.

In this way, the user can intuitively see the package drawing drawn by the processor 3000.

In some implementations, the processor 3000 is further configured to save the drawn pads, entity layer, height layer, and screen layer as a package file of the element.

It is easy to understand that the electronic device can first save the automatically drawn package drawing as a package file, and the user can open the saved package file to view and modify. Alternatively, the user can also view the drawn package drawing, and then the user can select to save the drawn package drawing as a package file.

Figure 2:
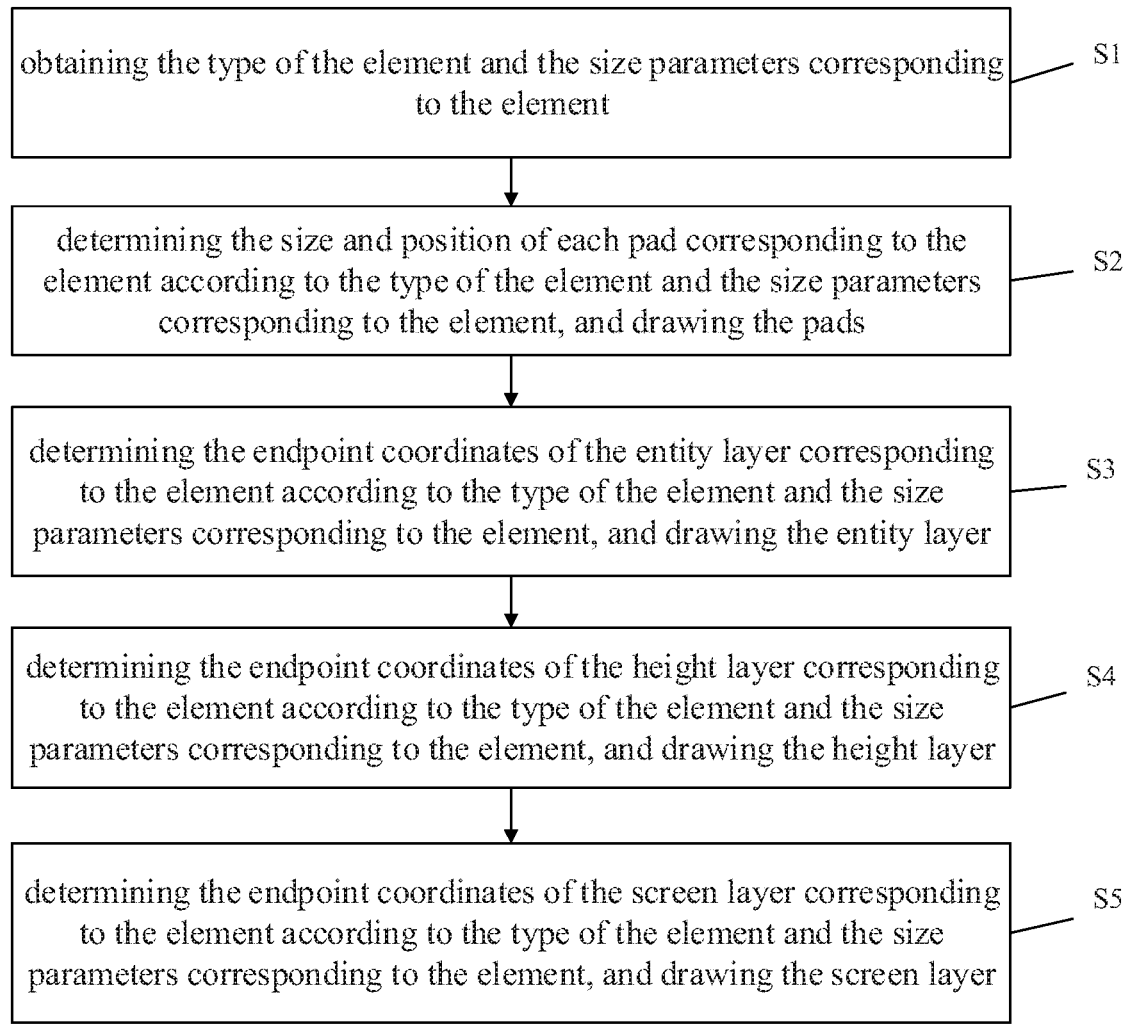
FIG. 2 is a flowchart showing a method for generating a package drawing of an element according to an embodiment of the present disclosure.

FIG. 2 is a flowchart illustrating a method for generating a package drawing of an element according to an embodiment of the present disclosure. In some implementations, the method may be based on Skill language, but the present disclosure is not limited thereto.

Referring to FIG. 2, the method may include steps S1 to S5.

In step S1, a type of an element and a size parameter(s) corresponding to the element are obtained. The type of the element can be set by default or selected by the user.

Figure 4:
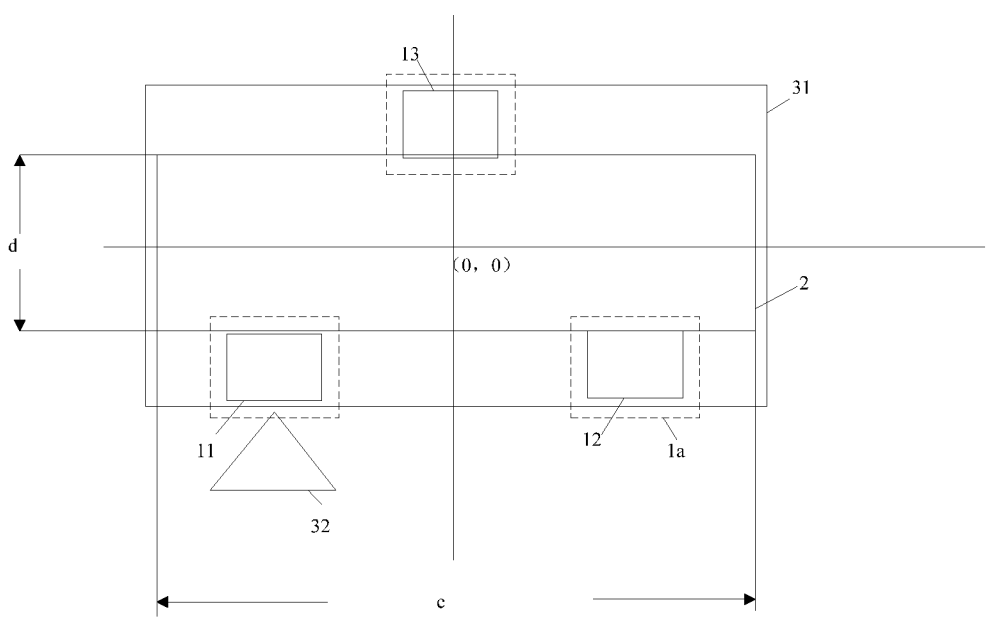
FIG. 4 is a schematic diagram showing a package drawing of a triode according to an embodiment of the present disclosure.
Figure 5:
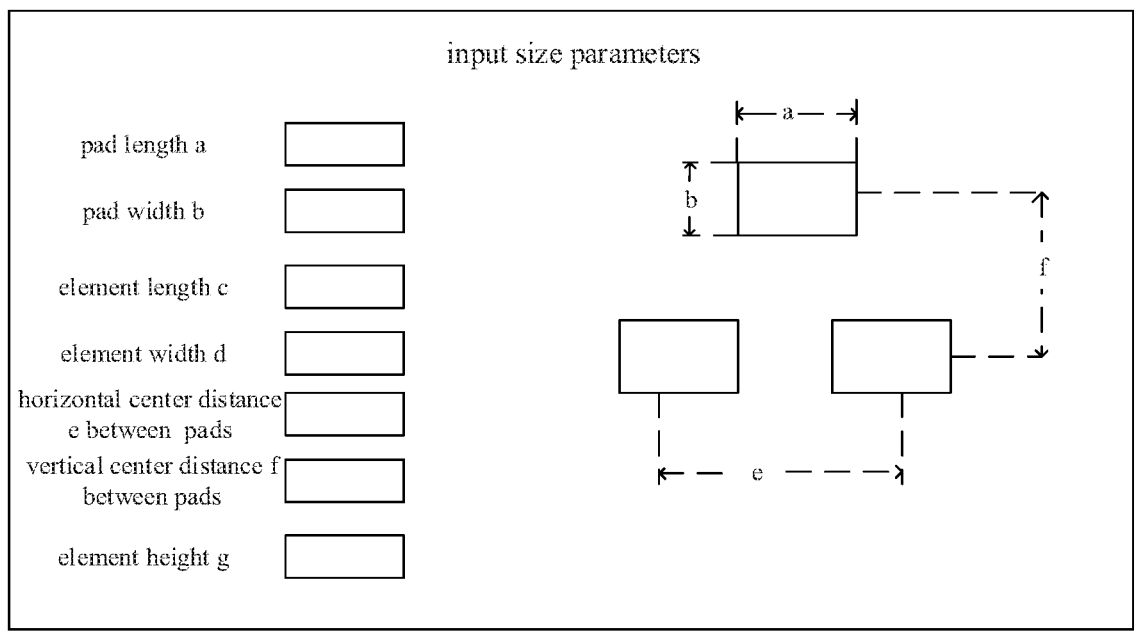
FIG. 5 is a schematic diagram showing a human-computer interface according to an embodiment of the present disclosure.

In some implementations, with reference to FIGS. 4 and 5, the parameters that need to be obtained may include the following: the type of the element (e.g., a triode), a length a and a width b of each of the pads, a physical length c and a physical width d of the element, relative positions of the pads, for example, a lateral center distance e of the pads (which represents a lateral distance between two adjacent pads), a longitudinal center distance f of the pads (which represents a longitudinal distance between two adjacent pads).

The following takes the type being a triode as an example for description. Specifically, the triode has three pins, and thus three pads (for example, a first pad 11, a second pad 12, and a third pad 13 in FIG. 4) need to be provided. In some implementations, sizes of the three pads required by the triode are the same. The physical length c and the physical width d are used to represent the physical sizes of the elements. In some implementations, the positional relationship between the pads, the entity layer 2, the screen layer, and the height layer is implemented by the programmer through parameter setting of the instructions according to a predetermined design criterion.

In step S2, the size and position of each of the pads corresponding to the element are determined according to the type of the element and the size parameters corresponding to the element, and each of the pads is drawn.

In some implementations, a single element usually has at least one pin, and thus one or more pads need to be provided for this element on a circuit board. For example, a resistor has two pins, and two pads need to be provided for the resistor on the circuit board.

In some implementations, the size parameters corresponding to the element may include, for example, the size parameters of each of the pads of the element and the spacing parameter between any two pads.

Figure 3:
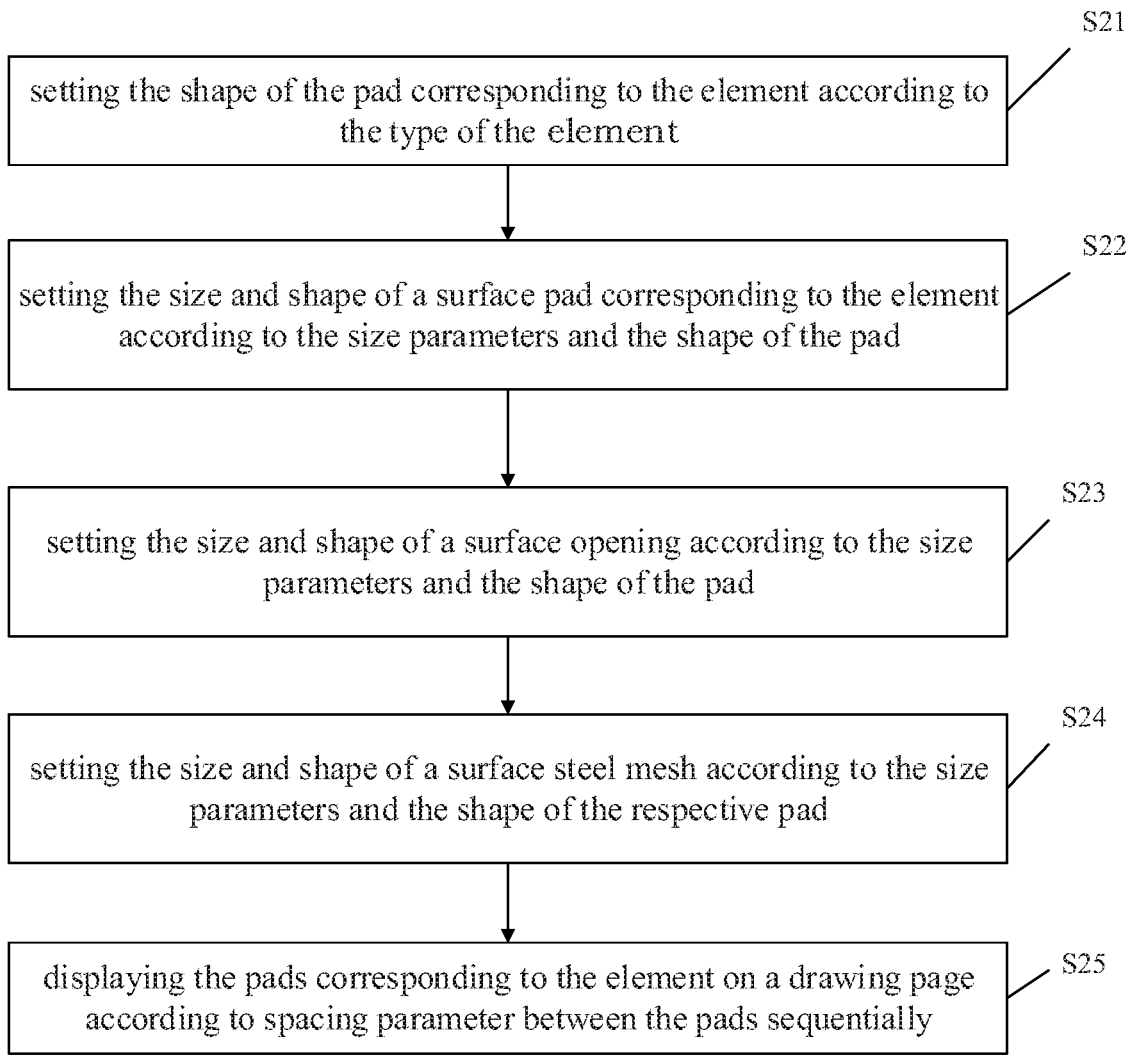
FIG. 3 is a flowchart showing a method for drawing a pad according to an embodiment of the present disclosure.

FIG. 3 is a flowchart showing a method for drawing a pad according to an embodiment of the present disclosure. In some implementations, referring to FIG. 3, step S2 may include steps S21 to S25.

In step S21, the shape of each of the pads corresponding to the element is configured according to the type of the element. For example, the shape of each of the pads corresponding to the triode can be set to a rectangle by default. Alternatively, the type of each of the pads can also be set by default, for example, the pads can be set as surface mount pads. The type parameters of each of the pads can be saved in a finally generated pad file for a manufacturer of the circuit board to view. In some implementations, for example, the type parameters of the pad can be set through a Skill statement, which may be invisible to the user who needs to draw the package drawing of the element. The programmer can make such set according to predetermined criterions.

Alternatively, before step S21, a precision unit (for example, millimeter) and the number of digits after the decimal point (for example, accurate to the fourth digit after the decimal point) of the pad in the program can be set. In some implementations, the setting can be set by default by the programmer according to predetermined criterions, which may not be visible to the user.

In step S22, the size and shape of the surface pad corresponding to the element are set according to the size parameters of the pad and the shape of the pad.

The size of the pad (i.e., the size of the actual pad) is substantially the same as the size marked in the current drawing space. The size items that need to be determined for different shapes of pads are different. For example, for a rectangular pad, it is needed to determine its length and width. For example, for a circular pad, it is needed to determine its radius. The position of the pad is substantially the coordinates of the pad in the current drawing space. Generally, extension directions of two adjacent sides of the initially drawn rectangular pad are set as a x direction and a y direction of the current drawing space.

The surface pad is substantially a graphic that represents an area of the pad in the package drawing. In some implementations, referring to FIG. 4, the lengths of the first pad 11, the second pad 12, and the third pad 13 are all set to a, and the widths thereof are set to b, and the first pad 11, the second pad 12, and the third pad 13 are all rectangular.

It should be understood that, in the case where the method described herein is implemented based on, for example, the Skill language, it is capable of first saving the drawing of a single pad as a pad file, then calling the pad file three times and then setting the specific position of each pad.

In step S23, the size and shape of a surface window are set according to the size parameters of the pad and the shape of the pad.

The surface window substantially represents a region on the circuit board that is not covered by an insulating layer such as green oil for each pad. Since these regions expose the underlying pads, the pins of the elements can be welded to the exposed pads.

In some implementations, referring to FIG. 4, for example, a length of the surface window 1a of each of the first pad 11, the second pad 12, and the third pad 13 can be set to a+0.1, and a width of the first pad 11, the second pad 12, and the third pad 13 can be set to b+0.1. It should be understood that the size of the surface window 1a can be freely adjusted according to pre-design criterions, and the present disclosure does not limit this.

In step S24, a size and a shape of a surface steel mesh are set according to the size parameters of the pad and the shape of the pad.

The surface steel mesh substantially represents opening positions of a porous steel mesh. In a preparation process of an actual circuit board, the steel mesh is placed on the circuit board, tin or red glue is brushed on the steel mesh, and the tin material is fixed on the circuit board through the opening positions of the steel mesh.

In some implementations, referring to FIG. 4, for example, the length of the surface steel mesh of each of the first pad 11, the second pad 12, and the third pad 13 can be set to a, and a width of each of the first pad 11, the second pad 12, and the third pad 13 can be set to b.

In step S25, the pads corresponding to the elements are displayed on a drawing page according to the spacing parameters of the pads.

The spacing parameters substantially represent a distance (e.g., center distance) between two adjacent pads along the x direction, for example, a distance between centers of two adjacent pads along the x direction, and a distance between two adjacent pads along the y-axis direction, for example, a distance between centers of two adjacent pads along the y direction, in the current drawing space, which is substantially the same as the spacing between the pads corresponding to the elements in the final printed circuit board.

Specifically, in some implementations, in order to simplify the program design, the center of the first pad 11 may be set at the coordinate origin (0, 0), the center of the second pad 12 may be set at the coordinate (e, 0), and the center of the third pad 13 is set at coordinates (e/2, f). The relative position relationships (i.e., relative coordinates) between each pad and each of the entity layer 2, the height layer and the screen layer can be determined according to the specification of the element and the predetermined design criterions, and thus the positions of the entity layer 2, the height layer and screen layer can be set according to the relative coordinates. Then, the pads, the entity layer 2, the height layer, and the screen layer can be moved as a whole, so that the center coordinate of the entire pads are at the origin. That is, the center position of the first pad 11, the second pad 12, and the third pad 13 is set as the origin. It should be understood that the programmer can also calculate the actual coordinates in advance, so as to arrange the pads, the entity layer 2, the height layer, and the screen layer at appropriate positions according to the actual coordinates, so that the center coordinates of the entire pads are at the origin.

It should be noted that in the above steps, it is necessary to ensure that the pad, the surface window and the surface steel mesh corresponding to the pad are located in a same position.

Generally, the patterns of the entity layer, the height layer, and the screen layer are all closed lines, and thus the following items need to be determined: the coordinates of each endpoint of the entity layer in the current drawing space, the coordinates of each endpoint of the height layer in the current drawing space, and the coordinates of each endpoint of the screen layer in the current drawing space. After determining the coordinates of these endpoints, the endpoints can be connected in sequence in the current drawing space to form a closed linear pattern. In the subsequent manufacturing process of the circuit board, these closed linear patterns have different functions, which will be described in detail later.

Referring to FIG. 2 again, in step S3, the coordinates of the endpoints of the entity layer corresponding to the element are determined according to the type of the element and the size parameters corresponding to the element, and the entity layer is drawn.

Specifically, referring to FIG. 4, the coordinates of the four endpoints of the entity layer 2 are sequentially set as: $(-(c-e)/2, b/2)$, $((c-e)/2+e, b/2)$, $((c-e)/2+e, b/2+d)$, $(-(c-e)/2, b/2+d)$.

In step S4, the coordinates of the endpoints of the height layer corresponding to the element are determined according to the type of the element and the size parameters corresponding to the element, and the height layer is drawn.

Specifically, referring to FIG. 4, the coordinates of the endpoints of the height layer are sequentially set as: $(-(c-e)/2,-b/2)$, $((c-e)/2+c,b/2)$, $((c-e)/2+c,f+b/2)$, $(-(c-e)/2,f+b/2)$. In some implementations, the function called may include creat_PLACE_BOUND_TOP.

In step S5, the coordinates of the endpoints of the screen layer corresponding to the element are determined according to the type of the element and the size parameters corresponding to the element, and the screen layer is drawn.

Since what needs to be drawn is the package pattern of the triode, the first screen layer 31 (which is used to represent the outline of the element) and the second screen layer 32 (which is used to represent the polarity of the transistor pins) need to be drawn.

Specifically, referring to FIG. 4, the coordinates of the endpoints of the first screen layer 31 are sequentially set as: $(-\{[(c-e)/2]+0.15\},-(b/2+0.15))$, $(\{(c-e)/2\}+c+0.15,b/2+0.15)$, $((c-e)/2+c+0.15,f+b/2+0.15)$, $(-\{[(c-e)/2]+0.15\},f+b/2+0.15)$.

The coordinates of the endpoints of the second screen layer 32 are sequentially set as: $(-(b/2+0.15), -(a/2+0.1))$, $(-(b/2+0.3), a/2+0.1)$, $(-(b/2+0.3), -(b/2+0.15))$.

In some implementations, the function called may include list, creat_line_shape_RECTANGLE_2, for example.

Thereafter, the screen layer can be drawn according to the determined coordinates of the endpoints of the screen layer. It should be understood that the above description is based on a triode as an example, but the present disclosure is not limited thereto, and various types of elements can be drawn as needed.

It should be noted that the execution order of step S2 to step S5 is not limited to sequential execution. That is, the drawing order of the pads, the entity layer 2, the height layer, and the screen layer can be adjusted as needed. The programmer can set the following operations: after the package file is generated, the user can open the package file to view the drawn package drawing. The programmer can also set the following operations: after completing the aforementioned step S1 to step S5, the drawn package drawing is shown to the user, and the user can select to save to generate the package file. In some implementations, in the package drawing, the pads, the entity layer 2 and the screen layer can be directly shown to the user, and the height layer is not visible to the user.

It should be noted that it is necessary to ensure that the pad, the entity layer, the height layer, and the screen layer correspond to the same position of the element.

A person skilled in the art can design a program based on the above-mentioned method based on, for example, the Skill language. After the program is run, the user only needs to input the necessary parameters, and the required package file can be automatically generated by the program. In this way, the workload of the user when drawing the element package can be greatly reduced, and the work efficiency can be improved.

In some implementations, the coordinates of each pad, the entity layer, the height layer, and the screen layer can be changed, so that the geometric center of the polygon formed by connecting the center of the pads is located at the coordinate origin of the drawing page. Specifically, it can be realized by moving the pads, the entity layer, the height layer, and the screen layer as a whole.

In some implementations, before obtaining the type of the element and the size parameters corresponding to the element, the types of a variety of elements may be displayed on an interface for the user to select the type of the element required to draw the package drawing, and a size parameter input prompting message is displayed on the interface for the user to input the size parameters required by the type of the selected element.

FIG. 5 is a schematic diagram showing a human-computer interface according to an embodiment of the present disclosure. In some implementations, referring to FIG. 5, the user can input the corresponding parameters through the human-computer interface to complete the generation of the package file of the element.

In some implementations, before drawing the pads, the entity layer, the height layer, and the screen layer, it is also possible to judge whether the obtaining of the size parameters corresponding to the element have been completely. If it is determined that the obtaining has been completed, the pads, the entity layer, the height layer, and the screen layer may be drawn. Otherwise, a prompting message is output to prompt the user to enter the complete size parameters.

In some implementations, before drawing the pads, the entity layer, the height layer, and the screen layer, it is also possible to determine whether the size parameters corresponding to the element input by the user satisfy the criterions according to the type of the element. If so, the drawing of the pads, the entity layer, the height layer, and the screen layer is performed. Otherwise, a prompting message is output to prompt the user to input the size parameters satisfying the design criterion.

In some implementations, before obtaining the size parameters of the element, the human-computer interface may also be provided for the user to select the type of the element for which the package file is to be generated. For example, the user can select the package file of a diode or the package file of a triode to be created.

In some implementations, the size parameters of the element may also include a height of the element, and a file name of the package file of the element may include the height of the element. That is, the file name of the automatically generated package file reflects the height parameter of the element.

On the other hand, an embodiment of the present disclosure further provide a non-volatile computer readable storage medium storing instructions that can be executed by a device with processing functions to execute the method described herein.

The non-volatile computer readable storage medium may be, for example, semiconductor or solid-state memory, magnetic tape, removable computer disk, random access memory (RAM), read-only memory (ROM), hard disk, and optical disk. These instructions can be executed by a device such as a processor. It should be understood that the non-volatile computer readable storage medium may also be integrated with the processor.

It should be understood that the above description is only for the purpose of illustrating the principles of the present disclosure, but the disclosure is not limited thereto. Various modifications and improvements can be made by those skilled in the art without departing from the spirit and scope of the disclosure, and such modifications and improvements are also considered to be within the scope of the disclosure.

What is claimed is:

1. An electronic device, comprising:
    a display device configured to:
        display a first prompting message for a user to input a type of an element, and
        display a second prompting message for the user to input size parameters corresponding to the element; and
    a processor configured to:
        obtain the type of the element and the size parameters corresponding to the element input by the user;
        determine a size and a position of each of pads corresponding to the element according to the type of the element and the size parameters corresponding to the element, and draw the pads;
        determine coordinates of endpoints of an entity layer corresponding to the element according to the type of the element and the size parameters corresponding to the element, and draw the entity layer;
        determine coordinates of endpoints of a height layer corresponding to the element according to the type of the element and the size parameters corresponding to the element, and draw the height layer; and
        determine coordinates of endpoints of a screen layer corresponding to the element according to the type of the element and the size parameters corresponding to the element, and draw the screen layer.

2. The electronic device of claim 1, wherein the processor is further configured to:
    set a shape of each of the pads corresponding to the element according to the type of the element;
    set a size and a shape of a surface pad corresponding to the element according to the size parameters and the shape of each of the pad; and
    display the pads corresponding to the element on the display device according to a spacing parameter between the pads.

3. The electronic device of claim 2, wherein the processor is further configured to:
    set a size and a shape of a surface window according to the size parameters and the shape of each of the pads; and
    set a size and a shape of a surface steel mesh according to the size parameters and the shape of each of the pads.

4. The electronic device of claim 1, wherein the processor is further configured to display the pads, the entity layer, the height layer, and the screen layer which have been drawn on the display device.

5. The electronic device of claim 1, wherein the processor is further configured to save the pads, the entity layer, the height layer, and the screen layer which have been drawn, as a package file of the element.

6. A method for generating a package drawing of an element, comprising:
- obtaining a type of the element and size parameters corresponding to the element;
- determining a size and a position of each of pads corresponding to the element according to the type of the element and the size parameters corresponding to the element, and drawing the pads;
- determining coordinates of endpoints of an entity layer corresponding to the element according to the type of the element and the size parameters corresponding to the element, and drawing the entity layer;
- determining coordinates of endpoints of a height layer corresponding to the element according to the type of the element and the size parameters corresponding to the element, and drawing the height layer; and
- determining coordinates of endpoints of a screen layer corresponding to the element according to the type of the element and the size parameters corresponding to the element, and drawing the screen layer.

7. The method of claim 6, wherein the size parameters corresponding to the element comprises size parameters of each of the pads corresponding to the element and a spacing parameter between the pads corresponding to the element.

8. The method of claim 7, wherein the determining a size and a position of each of the pads corresponding to the element according to the type of the element and the size parameters corresponding to the element and drawing the pads comprises:
- setting a shape of each of the pads corresponding to the element according to the type of the element;
- setting a size and a shape of a surface pad corresponding to the element according to the size parameters and the shape of each of the pads; and
- displaying the pads corresponding to the element on a drawing page according to the spacing parameter between the pads.

9. The method of claim 8, wherein the determining a size and a position of each of the pads corresponding to the element according to the type of the element and the size parameters corresponding to the element and drawing the pads comprises:
- setting a size and a shape of a surface window according to the size parameters and the shape of each of the pads; and
- setting a size and a shape of a surface steel mesh according to the size parameters and the shape of each of the pads.

10. The method of claim 9, further comprising:
- changing the coordinate of each of the pads, the entity layer, the height layer, and the screen layer, so as to set a geometric center of a polygon formed by connecting centers of the pads at a coordinate origin of the drawing page.

11. The method of claim 10, further comprising:
- determining that obtaining of the size parameters corresponding to the element has been completed before drawing the pads, the entity layer, the height layer, and the screen layer.

12. The method of claim 11, further comprising:
- determining that the obtained size parameter corresponding to the element satisfies a criterion according to the type of the element before drawing the pads, the entity layer, the height layer, and the screen layer.

13. The method of claim 12, further comprising:
- outputting a prompting message when determining that the obtaining of the size parameter corresponding to the element has not been completed or determining that the obtained size parameters corresponding to the element does not satisfy the criterion.

14. A non-volatile computer readable storage medium storing instructions that can be executed by a processor to cause the processor to execute the method of claim 6.

* * * * *